United States Patent
Abbasfar

(10) Patent No.: US 12,463,749 B2
(45) Date of Patent: Nov. 4, 2025

(54) METHOD AND APPARATUS FOR GENERATING ERROR CORRECTING CODES WITH TRANSITION ENCODING

(71) Applicant: Samsung Electronics Co., Ltd., Gyeonggi-do (KR)

(72) Inventor: Aliazam Abbasfar, Santa Clara, CA (US)

(73) Assignee: Samsung Electronics Co., Ltd., Seoul (KR)

(*) Notice: Subject to any disclaimer, the term of this patent is extended or adjusted under 35 U.S.C. 154(b) by 20 days.

(21) Appl. No.: 18/478,505

(22) Filed: Oct. 27, 2023

(65) Prior Publication Data
US 2024/0413929 A1 Dec. 12, 2024

Related U.S. Application Data

(60) Provisional application No. 63/507,265, filed on Jun. 9, 2023.

(51) Int. Cl.
*H04L 1/00* (2006.01)

(52) U.S. Cl.
CPC .................... *H04L 1/0061* (2013.01)

(58) Field of Classification Search
CPC ... H04L 1/0041; H04L 1/0045; H04L 1/0061; H04L 1/0057; H04L 1/0071; H04L 1/0042; H03M 13/098; H03M 13/2909; H03M 13/2918; H03M 13/2963
See application file for complete search history.

(56) References Cited

U.S. PATENT DOCUMENTS

| | | | |
|---|---|---|---|
| 9,065,625 B2 * | 6/2015 | Flowers | H03M 13/2963 |
| 9,363,114 B2 | 6/2016 | Shokrollahi et al. | |
| 9,391,647 B2 | 7/2016 | Hung et al. | |
| 2003/0192006 A1 * | 10/2003 | Coakeley | H03M 13/098 |
| | | | 714/776 |
| 2005/0034052 A1 | 2/2005 | Das Sharma | |
| 2007/0089035 A1 | 4/2007 | Alexander et al. | |
| 2008/0163033 A1 | 7/2008 | Yim | |
| 2015/0006990 A1 * | 1/2015 | Wang | H03M 13/1595 |
| | | | 714/755 |
| 2015/0067012 A1 | 3/2015 | Goettfert et al. | |

* cited by examiner

*Primary Examiner* — Shelly A Chase
(74) *Attorney, Agent, or Firm* — The Farrell Law Firm, P.C.

(57) ABSTRACT

A system and a method are disclosed for encoding data including receiving at least one block of data; encoding the at least one block of data by generating a two-dimensional (2D) table having a plurality of rows and a plurality of columns, wherein one or more bits included in the at least one block is formed as a first row included in the plurality of rows, an odd parity bit is appended to each of the plurality of rows, and an error correction code is formed for each of the plurality of columns; and transmitting the encoded at least one block of data row by row over a serial link.

17 Claims, 7 Drawing Sheets

METHOD AND APPARATUS FOR GENERATING ERROR CORRECTING CODES WITH TRANSITION ENCODING

PRIORITY

This application claims the priority benefit under 35 U.S.C. § 119(e) of U.S. Provisional Application No. 63/507,265, filed on Jun. 9, 2023, the disclosure of which is incorporated by reference in its entirety as if fully set forth herein.

FIELD

The disclosure generally relates to digital signal processing. More particularly, the subject matter disclosed herein relates to improvements to serial link communication.

BACKGROUND

In serial data communication systems, the integration of embedded clock signals, also known as transitions, are frequently included in serial data signals. Encoders play a crucial role in serializing data bits for subsequent transmission to receivers and/or decoders. The decoder's ability to discern intermittent transitions amid the binary 0's and 1's within the received serial bitstream (also referred to as a serial data signal) enables the synchronization of its internal clock. This synchronization, in turn, facilitates accurate sampling of the incoming bitstream.

The efficacy of this synchronization hinges upon the frequency of transitions, as they need to occur with sufficient regularity. This ensures the successful integration of the encoder's clock signal into the serial bitstream, thereby enabling the decoder to operate harmoniously.

To avoid scenarios where extended sequences of identical bits (0s or 1s) disrupt the decoder's synchronization, the encoder must take measures to incorporate an ample number of transitions in the serial bitstream. By doing so, the decoder can identify the clock signal utilized for encoding the bitstream. This identification, in conjunction with precise sampling and decoding, guarantees accurate interpretation of the serial bitstream's data.

One approach of inserting transitions into the serial bitstream involves the periodic insertion of distinct transition bits at fixed intervals, such as every nth bit (e.g., every 10th bit). These transition bits hold an inverse value to the preceding bit, thereby maintaining a consistent presence of transitions. Nevertheless, this method is inherently inefficient, as it allocates a portion of the bitstream solely for clock signal purposes, foregoing the conveyance of meaningful information.

In light of these considerations, the present Application seeks to address this challenge by devising more refined techniques for infusing transitions within serial bitstreams to more effectively and efficiently encode a clock signal into a bit stream.

SUMMARY

The present disclosure has been made to address at least the above-mentioned problems and/or disadvantages and to provide at least the advantages described below.

In an embodiment, a method for encoding data includes receiving at least one block of data; encoding the at least one block of data by generating a two-dimensional (2D) table having a plurality of rows and a plurality of columns, wherein one or more bits included in the at least one block is formed as a first row included in the plurality of rows, an odd parity bit is appended to each of the plurality of rows, and an error correction code is formed for each of the plurality of columns; and transmitting the encoded at least one block of data row by row over a serial link.

In an embodiment, a method for encoding data includes receiving at least one block of data; encoding the at least one block of data by generating a 2D table having a plurality of rows and a plurality of columns, wherein one or more bits included in the at least one block is formed as a first row included in the plurality of rows, a parity bit and an alternating data (AD) bit are appended to the first row included in the plurality of rows, and an error correction code is formed for each of the plurality of columns; and transmitting the encoded at least one block of data row by row over a serial link.

In an embodiment, an electronic device includes a memory device, a processor configured to execute instructions stored on the memory device, wherein the instructions cause the processor to receive at least one block of data; encode the at least one block of data by generating a 2D table having a plurality of rows and a plurality of columns, wherein one or more bits included in the at least one block is formed as a first row included in the plurality of rows, an odd parity bit is appended to each of the plurality of rows, and an error correction code is formed for each of the plurality of columns; and transmit the encoded at least one block of data row by row over a serial link.

In an embodiment, an electronic device includes a memory device, a processor configured to execute instructions stored on the memory device, wherein the instructions cause the processor to receive at least one block of data; encode the at least one block of data by generating a 2D table having a plurality of rows and a plurality of columns, wherein one or more bits included in the at least one block is formed as a first row included in the plurality of rows, a parity bit and an AD bit are appended to the first row included in the plurality of rows, and an error correction code is formed for each of the plurality of columns; and transmit the encoded at least one block of data row by row over a serial link.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
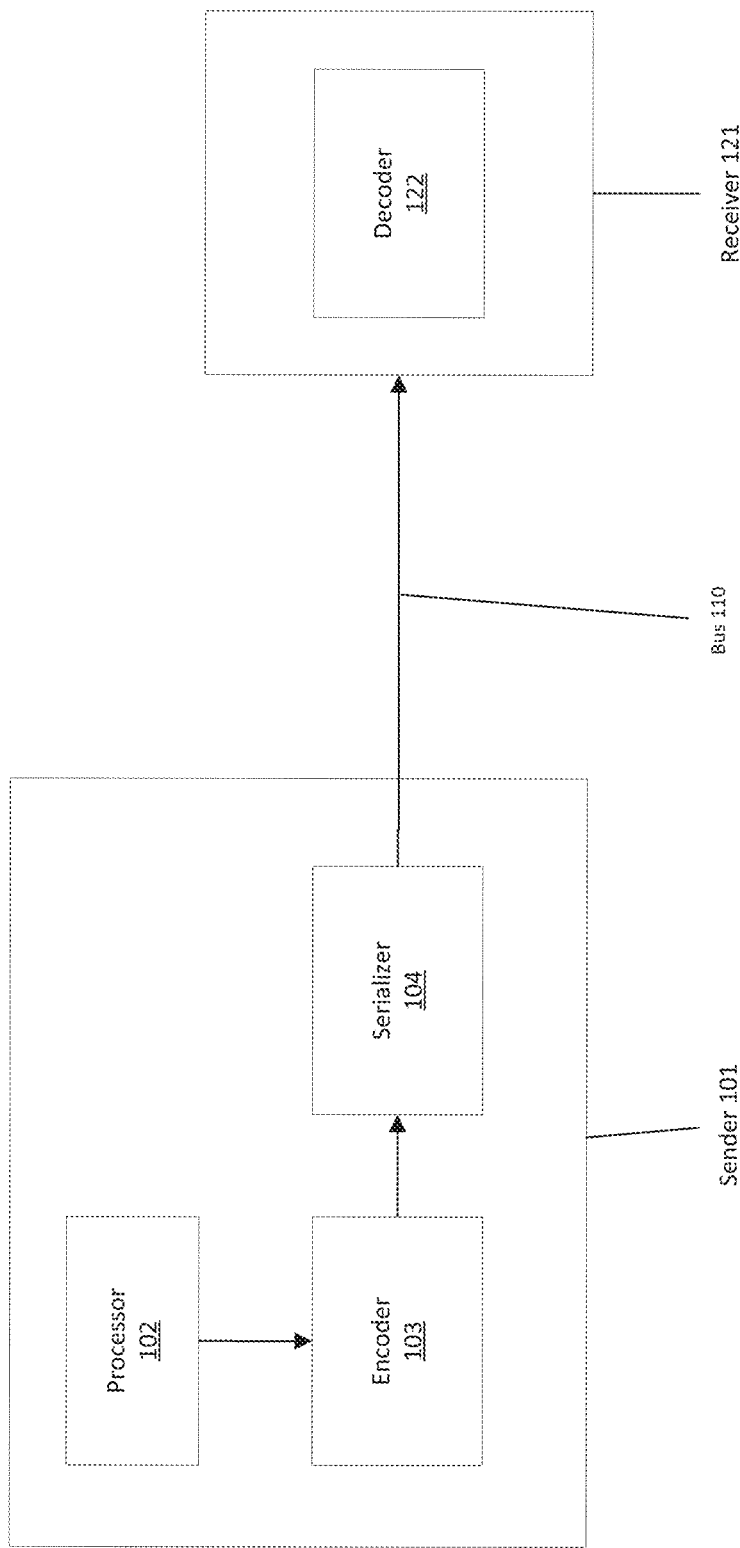
FIG. 1 illustrates a serial bitstream encoding and decoding system, according to an embodiment.

Embodiments of the present disclosure will be described herein below with reference to the accompanying drawings.

However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

Also, depending on the context of discussion herein, a singular term may include the corresponding plural forms and a plural term may include the corresponding singular form. It is further noted that various figures (including component diagrams) shown and discussed herein are for illustrative purposes only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a serial bitstream encoding and decoding system, according to an embodiment.

Referring to FIG. 1, a serial bitstream encoding and decoding system is provided. This system comprises two components: a sender 101 and a receiver 121. These elements are interconnected through a serial communications medium, specifically a bus labeled as bus 110. The primary function of this system is to facilitate the transmission and reception of a serial bitstream.

The sender 101 includes a processor 102, which acts as the data controller for executing instructions to implement the encoding and subsequent serial transmission. The data provided by the processor may include diverse forms of information such as American Standard Code for Information Interchange (ASCII) text data, pixel data for video or images (e.g., red green blue (RGB) data), sensory data, file data, video data, audio data, or other types of data. This data, comprising a combination of regular data and control signals, can be transmitted to an encoder 103.

The encoder 103 incorporates additional parity bits into the data, thus enabling error detection and, potentially, error correction upon reception by the receiver 121. The mechanism of choice for this purpose is often Hamming coding, which is recognized for its capacity to perform single error correcting-double error detecting (SEC-DED) operations at the receiver end. SEC-DED ensures the capability to correct a single erroneous bit within a block of data and detect the presence of two corrupted bits.

Although Hamming coding is referred to throughout the description as an error correction code for introducing additional parity bits to enable error correction, other error correction coding techniques may be applied. For instance, in addition to or alternative to Hamming coding, other well-known error correction coding techniques may be used, such as Reed-Solomon Coding, Turbo Coding, Low-Density Parity-Check (LDPC) Coding, Bose-Chaudhuri-Hocquenghem (BCH) Coding, Convolution Coding, and/or Cyclic Redundancy Check (CRC) coding.

The choice of error correction code may depend on factors such as the nature of the data, the channel conditions, and the desired amount of error correction.

Encoder 103 protects the data bits in a block of data by introducing parity bits, resulting in an output data block+ parity bits. This augmented output is relayed through serializer 104, which facilitates the sequential transmission of these bits through the bus 110 at a designated clock frequency.

As used herein, the term "parity bit" refers to any type of bit that is generated in accordance with an error detection and/or correction scheme and transmitted along with data bits in order to allow a decoder to detect and/or correct errors in the data transmission. Parity bits may be odd or even. In the case of an odd parity bit, if data associated with the odd parity bit already includes an odd number of 1s, the parity bit is set to 0 to maintain odd parity, and if the data includes an even number of 1s, the parity bit is set to 1 to make the total number of 1s odd. In the case of an even parity bit, if the data associated with the even parity bit already includes an even number of 1s, the parity bit is set to 0 to maintain even parity. If the data includes an odd number of 1s, the parity bit is set to 1 to make the total number of 1s even.

A "block" may refer to a fixed-size group of binary digits (bits) that are operated on as a unit by a processor or other hardware components. The size of a block may be determined by the architecture of the system and can vary. For example, in a 32-bit architecture, a block is 32 bits long, while in a 64-bit architecture, a block is 64 bits long. Blocks are used to represent various types of data such as integers, floating-point numbers, and memory addresses.

Referring to FIG. 1, at the receiver 121, the decoder 122 is able to deduce the embedded clock frequency utilized during the serialization by serializer 104. This deduction facilitates the accurate sampling of the serial signal (bitstream) present on bus 110, in alignment with the embedded clock signal.

Decoder 122, situated within the receiver 121, undertakes the task of receiving the merged combination of data and parity bits, which could potentially be corrupted. Drawing from this combination, the decoder 122 is capable of recovering the transmitted data. Depending on the context, it can rectify errors or identify their presence. The corrected or identified data is then forwarded to a designated data sink, often represented by a processor in or connected with the receiver, where further processing and utilization occur.

Although FIG. 1 illustrates a sender and receiver configuration in the system, other configurations to those of ordinary skill in the art may be used in accordance with the error correction coding architecture that is described herein. For example, multiple receivers, each having their own encoder can be used. Or, for instance, various types of electronic devices may be capable of housing both the sender (including the encoder 103) and the receiver (including the decoder 122). Also, some or all of the components included in the devices may include instructions that are executed in a cloud networking environment by processors that are located on site, or in external devices in a network environment.

Figure 2:
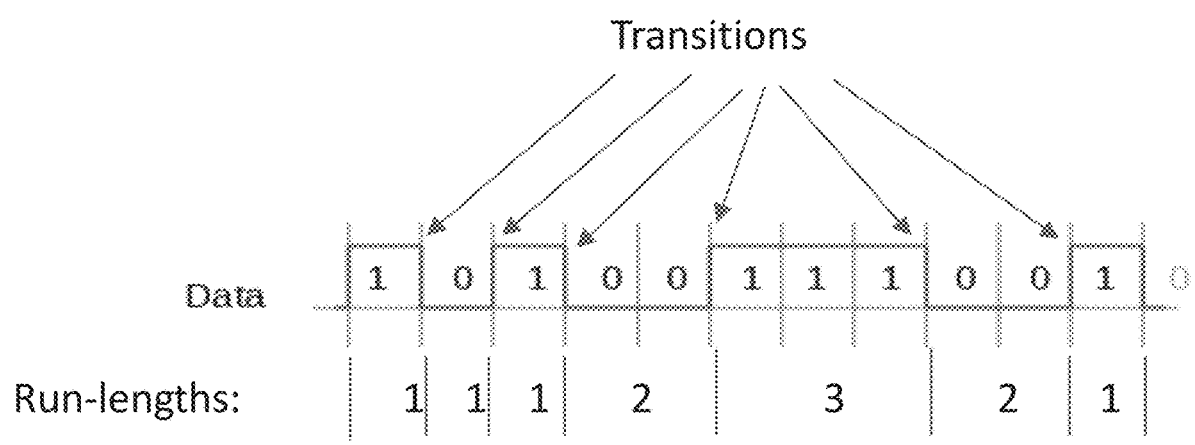
FIG. 2 illustrates a relationship between transitions and serial data, according to an embodiment.

FIG. 2 illustrates a relationship between transitions and serial data, according to an embodiment.

Embedded-clock serial links are communication channels where both data and clock signals are transmitted together. This approach eliminates the need for a separate clock line but necessitates a mechanism for the receiver to extract the clock signal from the data stream to properly sample and interpret the data.

Clock recovery is the process by which a receiver extracts the timing information necessary to properly sample the incoming data stream. One key aspect in clock recovery is the presence of transitions. A transition refers to a change in the voltage level of the data stream. A transition may be used to determine timing information within the data stream and can be based on the representation of 0's and 1's in the data stream. In many serial data encoding schemes, transitions in the data stream are represented by the boundaries between consecutive bits. When consecutive bits in the data stream change from a low voltage level (0) to a high voltage level (1), or vice versa, a transition may be encoded in the data stream.

Referring to FIG. 2, a transition occurs when the data in the data stream changes from one value to another (e.g., from "0" to "1" or vice versa). These transitions are used for the receiver's clock recovery mechanism to update and adjust its sampling timing. Without transitions, the receiver would lose synchronization and its ability to accurately interpret the data.

Run-length refers to a consecutive sequence of same data bit values in a data stream. To ensure reliable clock recovery, it's necessary to limit the worst-case run-length where no transitions occur. If the data stream contains long sequences without transitions, the receiver's clock recovery mechanism may fail, leading to synchronization errors. Therefore, limiting the maximum run-length without transitions is crucial to maintain clock recovery stability.

To ensure a regular occurrence of transitions, encoding routines are used to modify the raw data before transmission.

For example, one routine may employ limited run-length encoding. This method focuses on limiting the consecutive length of identical bits. The encoding routine prevents excessively long runs of the same bit value by introducing transitions strategically, thus preventing the receiver from losing synchronization due to extended periods without transitions.

The present method and apparatus proposes introducing guaranteed transitions within data streams by leveraging error correcting codes (or forward error correction) to ensure guaranteed transitions in a manner that optimizes resource utilization and minimizes the number of bits used to achieve guaranteed transitions.

For example, a 2D block code is proposed, which introduces a highly effective error correction mechanism for data packets.

Figure 3:
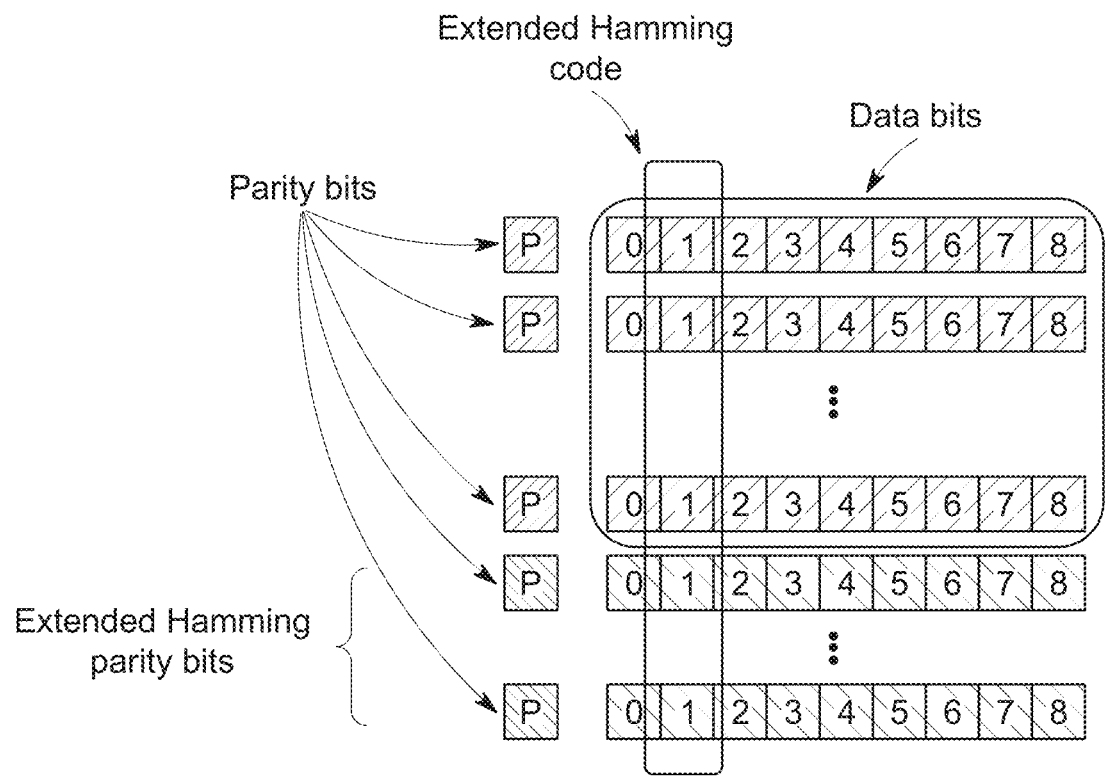
FIG. 3 illustrates a 2D block structure, according to an embodiment.

FIG. 3 illustrates a 2D block structure, according to an embodiment.

Referring to FIG. 3, a standard data packet may be transformed into a structured rectangular table, introducing parity bits for each row and extended Hamming parity bits for each column. This process results in a specially encoded packet that forms a robust and powerful error correcting code, capable of correcting at least a minimum of three error bits within a block of the transmitted data.

The parity bits may serve as a form of redundancy, allowing the receiver to identify and rectify errors that might occur during transmission. Additionally, extended Hamming parity bits are introduced for each column of the table. By applying parity bits to the column-wise arrangement, the error correction code gains enhanced error correction capabilities.

Hamming coding is a type of error-correcting code that is used to detect and correct errors in data transmission, and it is widely used in digital communication systems to ensure the integrity of transmitted data. Hamming codes are a subset of linear block codes, which means they encode a block of data bits into a longer encoded block by adding redundant bits.

The purpose of Hamming coding is to detect and correct single-bit errors that can occur during data transmission or storage. These errors can be caused by various factors, such as noise in communication channels or imperfections in memory storage. In addition, Hamming coding may include adding parity bits to the original data in such a way that errors can be detected and corrected.

For example, Hamming coding may include an encoding stage and an error detection and correction stage.

To perform the encoding stage, given a block of data bits to be transmitted, the Hamming coding adds parity bits at specific positions in a code block (e.g., a sequence of encoded bits). The positions of the parity bits are determined by powers of 2 (1, 2, 4, 8, etc.). Each parity bit may be responsible for checking a specific set of data bits. For example, the first parity bit might check bits 1, 3, 5, 7, and so on.

To perform the error detection and correction stage, when a block of data is received, the receiver checks the parity bits. If any of the parity bits do not match the expected value, an error is detected. The position of the incorrect parity bit indicates the position of the error. By comparing the error position with the positions of the parity bits, the receiver can identify and correct the erroneous bit.

The combination of row parity bits and extended Hamming column parity bits disclosed in the present Application results in a highly effective error correcting code. This error correction code is capable of identifying and correcting a substantial number of error bits within the transmitted data.

As described below, the aforementioned 2D block structure of FIG. 3 enables guaranteed transitions to be encoded into data using error correction coding.

Figure 4:
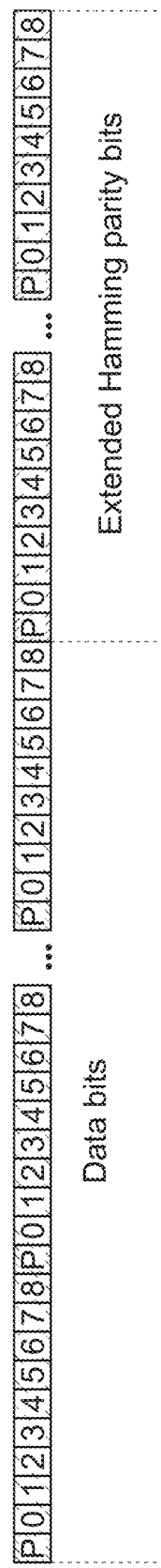
FIG. 4 illustrates a data structure for transmitting data row by row, serially, according to an embodiment.

FIG. 4 illustrates a data structure for transmitting data row by row, serially, according to an embodiment.

Referring to FIG. 4, data bits of the 2D structure are transmitted row by row over a serial link. The mechanism to guarantee transitions involves the utilization of odd parity bits for each row. This approach ensures that there is a transition in every row of transmitted data, thereby preventing the occurrence of long sequences of the same bit value with having a transition encoded therein, which can pose challenges for clock recovery and synchronization.

The data transmission occurs in a sequential manner, with each row of data bits being sent over the serial link. This row-by-row approach simplifies the process and facilitates error detection and correction. A "row" may be defined as a sequence of bits representing a part of input data. For example, each row may include 5 bits. Or, in another case, each row by include 9 bits. Other variations are possible.

For each row of data bits, an additional bit known as an odd parity bit is calculated and added. The odd parity bit is chosen such that the total number of "1" bits in the row (including the parity bit) is an odd number. This means that if there are an even number of "1" bits in the row, the parity bit is set to "1", otherwise, it's set to "0". This odd parity bit arrangement helps detect and correct errors in the row.

The introduction of an odd parity bit guarantees a transition in every row of transmitted data when the number of bits in a row is odd. Since the parity bit is computed according to an exclusive-nor (XNOR) function based on the number of "1" bits in the row, it ensures that there's always a change from one bit value to another.

The worst-case scenario for consecutive rows may also be considered. In such a worst-case scenario, two consecutive rows are examined, and the longest possible sequence of identical bits in these two rows is determined. The maximum run-length is calculated for scenarios where one row ends with all "0" bits and the next row starts with all "0" bits (e.g., "1000000000" and "0000000001"). By having guaranteed transitions within each row, even the worst-case scenario for consecutive rows is identified to include a transition.

Figure 5:
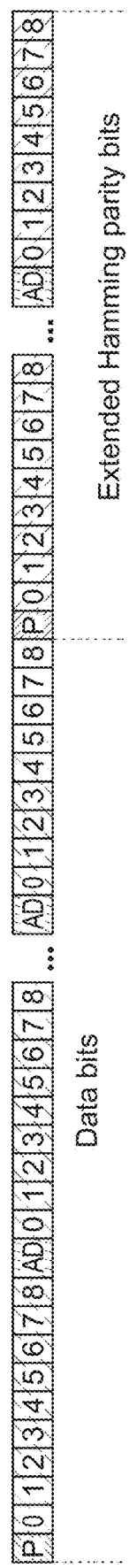
FIG. 5 illustrates a data structure for transmitting data row by row, serially, according to an embodiment.

FIG. 5 illustrates a data structure for transmitting data row by row, serially, according to an embodiment.

Referring to FIG. 5, similar to FIG. 4, data bits of the 2D structure are transmitted row by row over a serial link. In this case, however, AD bits are inserted before every other row of transmitted data. The AD holds the inverse value of the subsequent bit in the row. For instance, if the subsequent bit is "0", the "AD" bit will be "1", and vice versa.

A purpose of these AD bits is to ensure a consistent and deliberate pattern of alternating bits within each row. By introducing this alternating pattern, the embodiment aims to improve certain aspects of data transmission, such as synchronization and clock recovery, because the AD bit is able to guarantee that a transition is generated in the middle of the row. Thus, the parity bit does not necessarily need to be an odd parity bit to guarantee a transition. Since the AD bit guarantees a transition, even parity bits may be used.

Figure 6:
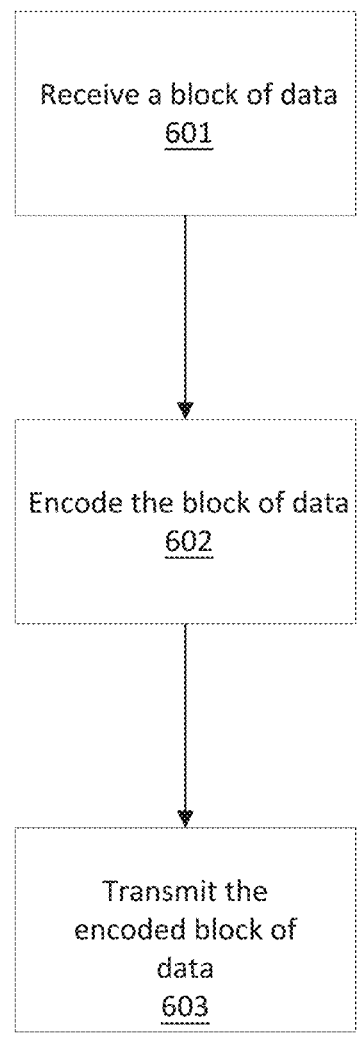
FIG. 6 is a flowchart illustrating a method of encoding to perform error code correction, according to an embodiment.

FIG. 6 is a flowchart illustrating a method of encoding to perform error code correction, according to an embodiment.

The method of FIG. 6 may be implemented on an electronic device (e.g., an electronic device disclosed in FIG. 7, below), a processor (e.g., a central processing unit (CPU)), and/or bitstream system (as illustrated in FIG. 1).

Referring to FIG. 6, at step 601, a block of data is received. As discussed above, a "block" may refer to a fixed-size group of binary digits (bits) that are operated on as a unit by a processor or other hardware components.

At step 602, the at least one block is encoded by generating a 2D table having a plurality of rows and a plurality of columns. The at least one block is formed as a first row included in the plurality of rows, an extended hamming code is formed as the last rows included in the plurality of rows, and an odd parity bit is appended to each of the plurality of rows, such that at least one transition is encoded for each of the plurality of rows. The structure of the 2D table may be similar to that which is illustrated in FIG. 3.

Additionally or alternatively, in step 602, the at least one block of data may be encoded by forming the 2D table such that the at least one block is formed as a first row included in the plurality of rows, an extended hamming code is formed as the last rows included in the plurality of rows, a parity bit is appended to the first row included in the plurality of rows, and an alternating data (AD) bit is appended to a second row included in the plurality of rows, such that at least one transition is encoded for each of the plurality of rows. In this case, the parity bit may be even or odd.

At step 603, the encoded at least one block of data is transmitted row by row over a serial link.

Figure 7:
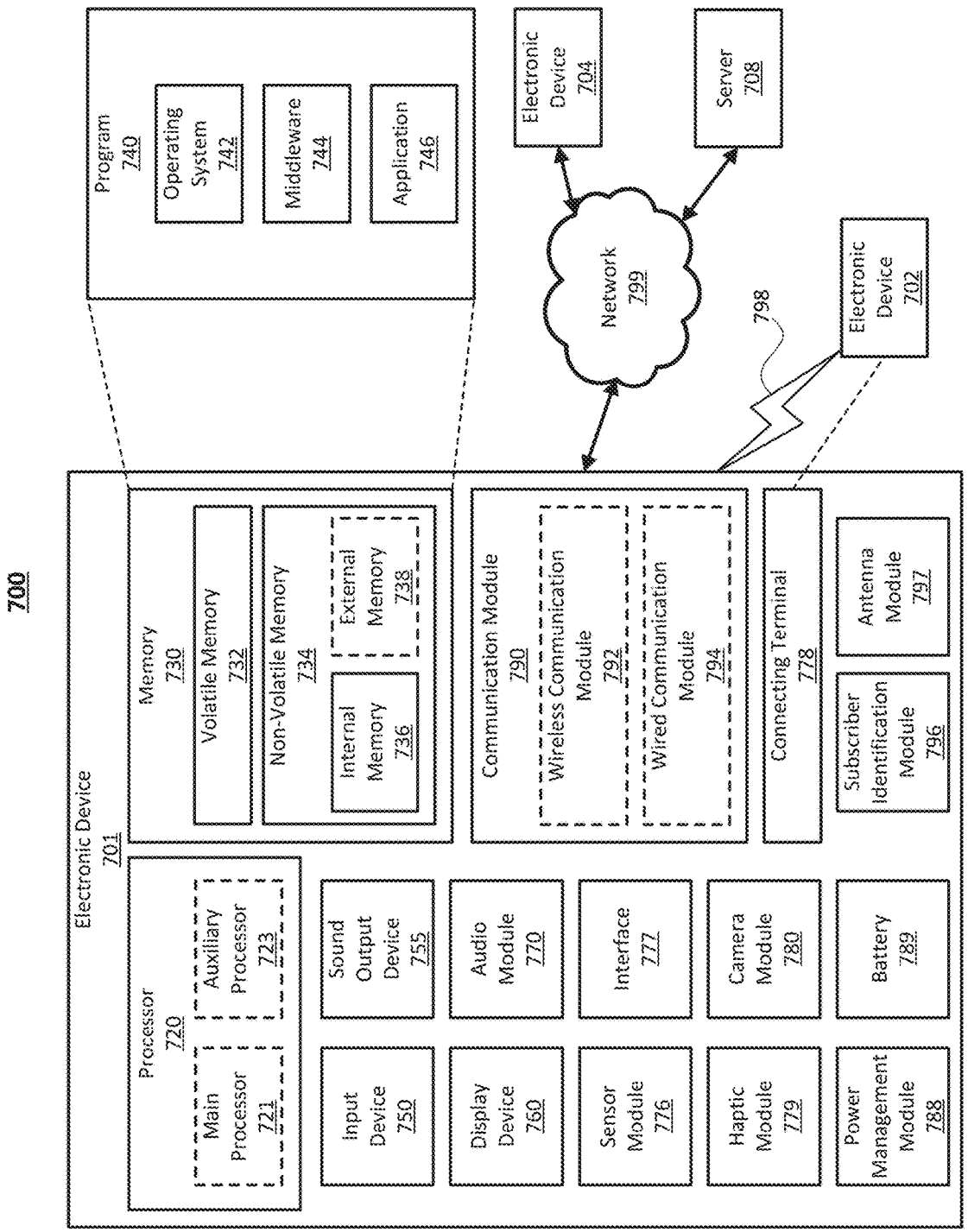
FIG. 7 is a block diagram of an electronic device in a network environment, according to an embodiment.

FIG. 7 is a block diagram of an electronic device in a network environment, according to an embodiment.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a CPU or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734. Non-volatile memory 734 may include internal memory 736 and/or external memory 738.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as BLUETOOTH™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the appended claims and their equivalents.

What is claimed is:

1. A method for encoding data, comprising:
   receiving at least one block of data;
   encoding the at least one block of data by generating a two-dimensional (2D) table having a plurality of rows and a plurality of columns, wherein one or more bits included in the at least one block is formed as a first row included in the plurality of rows, an odd parity bit is appended to each of the plurality of rows, and an error correction code is formed for each of the plurality of columns; and
   transmitting the encoded at least one block of data row by row over a serial link,
   wherein the odd parity bit is computed based on an exclusive-nor (XNOR) operation.

2. The method of claim 1, wherein at least one transition is encoded for each of the plurality of rows by performing the XNOR operation on each of the plurality of rows.

3. The method of claim 1, wherein parity bits of the error correction code for each of the plurality of columns appear in one or more last rows included in the plurality of rows.

4. The method of claim 1, wherein the first row included in the plurality of rows has a length of 9 bits.

5. The method of claim 4, wherein at least one transition is encoded every 19 consecutive bits in the encoded at least one block of data.

6. The method of claim 1, in case that the one or more bits included in the at least one block formed as the first row is entirely comprised of 0's, the odd parity bit of the first row is 1.

7. The method of claim 1, in case that the one or more bits included in the at least one block formed as the first row is entirely comprised of 1's, the odd parity bit of the first row is 0.

8. A method for encoding data, comprising:
receiving at least one block of data;
encoding the at least one block of data by generating a two-dimensional (2D) table having a plurality of rows and a plurality of columns, wherein one or more bits included in the at least one block is formed as a first row included in the plurality of rows, a parity bit is appended to the first row included in the plurality of rows, an alternating data (AD) bit having an inverse value of a subsequent bit is appended to the first row included in the plurality of rows, and an error correction code is formed for each of the plurality of columns; and
transmitting the encoded at least one block of data row by row over a serial link.

9. The method of claim 8, wherein the parity bit is an odd parity bit or an even parity bit.

10. The method of claim 8, wherein parity bits of the error correction code for each of the plurality of columns appear in one or more last rows included in the plurality of rows.

11. An electronic device, comprising:
a memory device,
a processor configured to execute instructions stored on the memory device, wherein the instructions cause the processor to:
receive at least one block of data;
encode the at least one block of data by generating a two-dimensional (2D) table having a plurality of rows and a plurality of columns, wherein one or more bits included in the at least one block is formed as a first row included in the plurality of rows, an odd parity bit is appended to each of the plurality of rows, and an error correction code is formed for each of the plurality of columns; and
transmit the encoded at least one block of data row by row over a serial link,
wherein the odd parity bit is computed based on an exclusive-nor (XNOR) operation.

12. The electronic device of claim 11, wherein at least one transition is encoded for each of the plurality of rows by performing the XNOR operation on each of the plurality of rows.

13. The electronic device of claim 11, wherein parity bits of the error correction code for each of the plurality of columns appear in one or more last rows included in the plurality of rows.

14. The electronic device of claim 11, wherein the first row included in the plurality of rows has a length of 9 bits.

15. The electronic device of claim 14, wherein at least one transition is encoded every 19 consecutive bits in the encoded at least one block of data.

16. The electronic of claim 11, in case that the one or more bits included in the at least one block formed as the first row is entirely comprised of 0's, the odd parity bit of the first row is 1.

17. The electronic device of claim 11, in case that the one or more bits included in the at least one block formed as the first row is entirely comprised of 1's, the odd parity bit of the first row is 0.

* * * * *